July 21, 1970

A. N. BROERS 3,521,113

ELECTRON BEAM APPARATUS INCORPORATING A HOLLOW PYRAMIDAL
INDIRECTLY HEATED CATHODE MEMBER

Filed Feb. 19, 1969

INVENTOR
ALEC N. BROERS

BY *Ray A. Schlemmer, Jr.*

ATTORNEY

United States Patent Office 3,521,113
Patented July 21, 1970

3,521,113
ELECTRON BEAM APPARATUS INCORPORATING A HOLLOW PYRAMIDAL INDIRECTLY HEATED CATHODE MEMBER
Alec N. Broers, Purdy Station, N.Y., assignor to International Business Machines Corporation, Armonk, N.Y., a corporation of New York
Continuation-in-part of application Ser. No. 552,190, May 23, 1966. This application Feb. 19, 1969, Ser. No. 800,439
Int. Cl. H01j 1/02
U.S. Cl. 313—309
6 Claims

ABSTRACT OF THE DISCLOSURE

Electron beam apparatus for producing a high intensity very stable electron beam for use in certain electron beam devices. The apparatus includes a hollow pyramidal refractory material cathode adapted to produce a very high intensity electron beam from the exterior apex thereof. A holder is provided for said cathode together with means for effecting electron bombardment at the interior apex thereof and electron optic means for forming an electron beam from the electrons emitted from the exterior apex of said cathode structure.

This application is a continuation in part of application Ser. No. 552,190, filed May 23, 1966, now abandoned.

BACKGROUND OF THE INVENTION

A number of scientific areas require the use of high intensity electron beams for various purposes. Among these are the various types of electron microscopy, electron beam machining and welding, and electron beam recording to name but a few. An additional requirement in a number of the instruments just recited is that the electron beam must be initiated and maintained under conditions of comparatively poor vacuum. In other words, the electron gun must operate satisfactorily in demountable vacuum systems where the vacuum sealing is obtained using rubber O-rings and/or where material which gives off gas is continuously passed into and out of the vacuum chamber for example as in electron beam recording. In such environments gas erosion and contamination of the cathode surface greatly complicate the problems of the electron source system.

Additionally, in such complex and delicate instruments the physical stability or alignment of the electron beam is critical. This alignment is seriously effected by any movement of the electron source. Of equal importance, especially in electron microscopy, is that the beam must emanate from a point source if satisfactory beam shapes are to be achieved.

The major operational criterion for an electron gun used in an electron microscope, or an electron probe system, is the brightness (amp/cm.²/steradian) of the electron beam that it produces. Langmuir determined that the maximum brightness that could be obtained from any electron gun using a cathode at a given temperature was given by the expression:

$$B = \frac{j_c eV}{\pi kT}$$

where

B—brightness (amp/cm.²/steradian)
$j_c$—specific emission of the cathode (amp/cm.²)
e—electronic charge (e.s.u.)
V—accelerating potential (volts)
k—Boltzmann's constant
T—absolute temperature of the cathode (° K.)

Up to cathode emission densities of about 2 amp/cm.² it has been determined that this brightness can be closely obtained in practice with a standard triode electron gun as used in electron microscopes. Above this figure, however, the efficiency of the gun deteriorates due to divergence of the emitted electrons under the influence of space-charge. If the source becomes large and the electric field concentration at its surface becomes low the space-charge limit occurs for lower emission current densities.

Directly heated tungsten hairpin cathodes have long been used where relatively high emission current density is required from a small electron source in such demountable vacuum systems. The lifetime of the hairpin cathode is limited by three factors including evaporation of the cathode itself, cathode sputtering, and gas erosion. However, in most systems only the evaporation of the cathode is critical. The life of the hairpin cathode is generally terminated by the formation of a "hot-spot" just below the apex of the hairpin. This "hot-spot" forms because radiated heat is concentrated at this point and blow-out of the cathode usually occurs when the wire at the tip has thinned by about 10%. For example, the conventional 5 mil tungsten hairpin will operate at an emission current density of 2.7 amp/cm.² for approximately 40 hours. With such a relatively short lifetime, costs and time for replacing such electrodes become a serious problem with certain types of applications where maintenance time is restricted. The hairpin cathode also has poor mechanical stability.

The relatively poor vacuum in which such cathodes have to operate obviates the use of the various oxide, dispenser, and field emission cathodes. The refractory metals and various other refractory materials must be of necessity be utilized for producing the emission densities required at such pressures.

If high brightness is to be obtained from the standard three electrode gun the geometry of the gun must be such that the field concentration at the electron source is high. This is most easily obtained by using sharply pointed cathodes. Thick hairpins and flat or disc type cathodes are not suitable. For example, the maximum brightness that could be obtained experimentally from a 15 mil tungsten hairpin in a conventional electron gun regardless of the cathode temperature was approximately $2.5 \times 10^4$ amp/cm.² steradian for an accelerating potential of 12 kv. This compares unfavorably with desired brightness of the order of $10^5$/amp/cm.²/steradians which can be obtained from hairpins made from 5 mil tungsten wire.

PRIOR ART

U.S. Pat. No. 2,141,838 of P. T. Farnsworth filed Mar. 22, 1937 entitled "Split Cathode Multiplier Tube."

U.S. Pat. No. 2,567,624 of A. Thompson et al. filed Sept. 2, 1947 entitled "Cathode Arrangement for Electron Discharge Devices."

U.S. Pat. No. 2,640,950 of L. J. Cook filed June 6, 1951 entitled "Point Electron Source."

SUMMARY OF THE INVENTION AND OBJECTS

It has now been found that a very bright electron beam having excellent physical stability may be obtained by utilizing a hollow refractory material conical cathode having long life characteristics in a triode type electron gun apparatus wherein said cathode is indirectly heated by electron bombardment. Further, by making the wall section of said conical cathode thicker adjacent the apex thereof a significant increase in the life of said cathode without seriously detracting from other characteristics may be achieved. The tip of the cone can also be made smaller than the apex of a 5 mil tungsten hairpin and higher brightness therefore obtained.

It is a primary object of the present invention to provide electron beam apparatus capable of producing a very stable high intensity electron beam.

It is a further object of the present invention to provide a novel cathode for use in such high intensity electron beam apparatus.

It is yet another object of the invention to provide such a cathode having a significantly increased life cycle even under relatively poor vacuum conditions.

It is still another object of the invention to provide such a cathode in an electron beam apparatus which is mechanically very stable and which provide a very precise point emission source.

It is a further object to provide such a cathode wherein precise electrode positioning can be obtained.

It is yet another object of the present invention to provide a novel cathode heated by electron bombardment from the interior apex thereof.

The foregoing and other objects, features and advantages of the invention will be apparent from the following more particular description of preferred embodiments of the invention, as illustrated in the accompanying drawings.

DESCRIPTION OF THE DISCLOSED EMBODIMENTS

The objects of the present invention are accomplished in general by an electron beam apparatus including a hollow pyramidal refractory material cathode adapted to produce an electron beam from the exterior apex thereof and to be indirectly heated by electron bombardment from the interior apex thereof. The overall beam forming apparatus includes an electron gun including said hollow conical refractory material cathode, a holder for supporting said cathode, indirect heating means for said cathode including a refractory metal filament, means for heating said filament, means for forming a first electron beam between said refractory metal filament and said interior apex of the hollow conical cathode and electron beam forming means for forming a high intensity electron beam from electrons emanating from the exterior apex of said cathode. The preferred form of the cathode is conical however a many-faceted regular pyramid electrode should function similarly.

The improved cathode structure and the resultant improved electron beam apparatus provided by the present invention are capable of producing a high intensity electron beam for use in such devices as electron microscopes, electron beam recording devices, etc. The cathode structure per se produces very high intensity point source electron beams and has the further advantage of a lifetime on the order of 5 to 10 times greater than that of directly heated tungsten hairpin cathodes which are conventionally used in such devices. An additional advantage as stated previously which is quite important in certain types of apparatus is the mechanical or physical stability of the resultant cathode structure whereby once the electron gun is precisely aligned the electron beam source from the apex of the hollow conical cathode remains very constant and thus focusing and desired deflection is rendered much less troublesome than with other types of cathodes.

Figure 3:
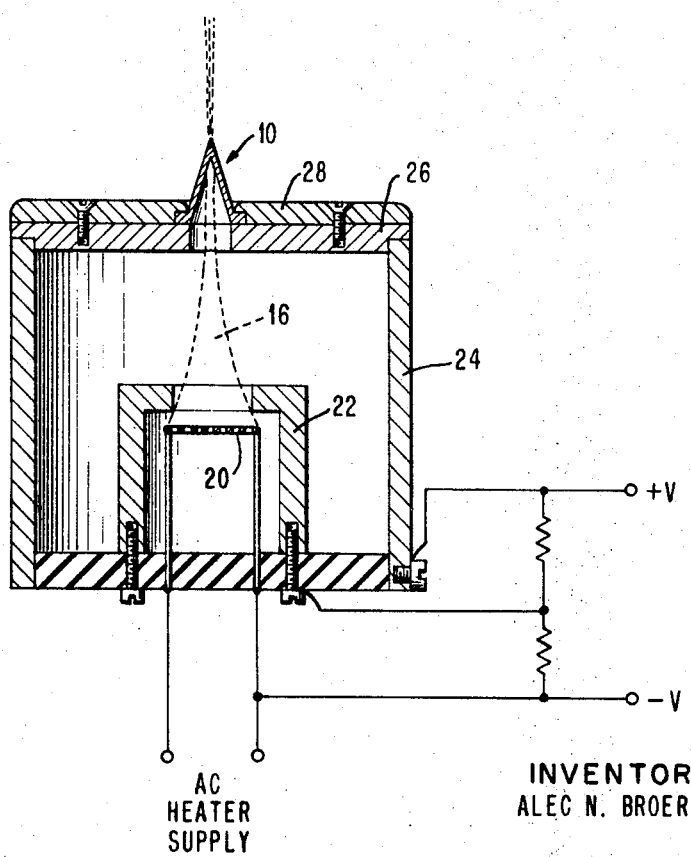
FIG. 3 is a cross-sectional view of an elevation of an electron cathode apparatus using a hollow cone-shaped cathode electrode together with an electron gun which is utilized to heat the cathode.
Figure 4:
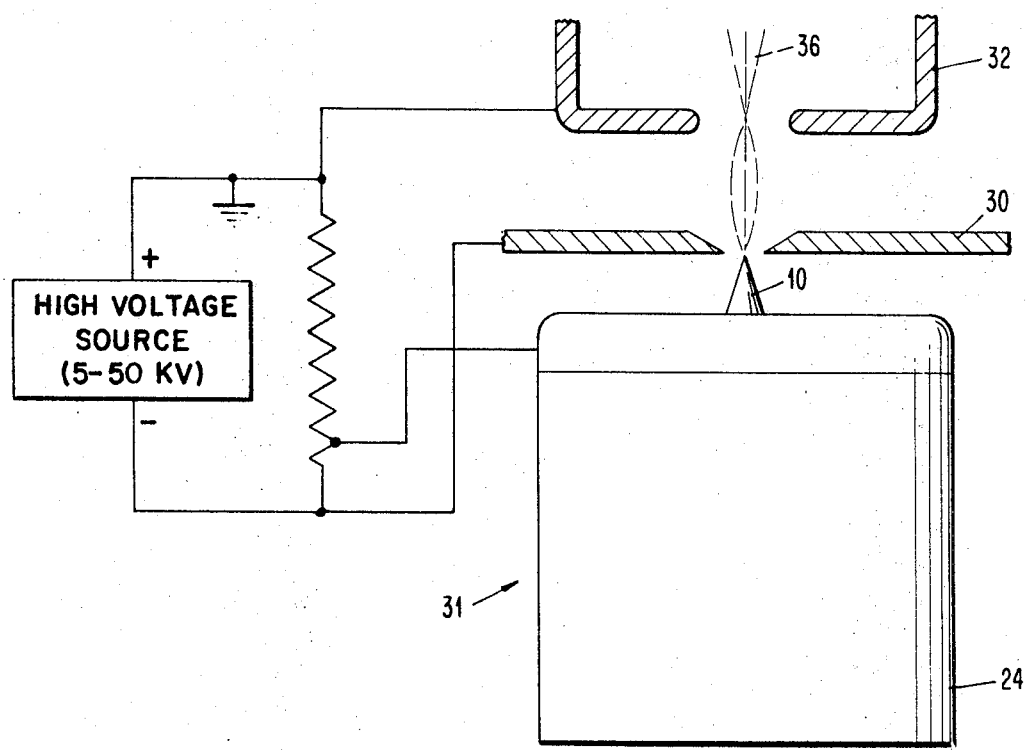
FIG. 4 is an overall sectional view of the electron beam apparatus of the present invention.

It should perhaps be understood that in the cathode system illustrated in FIG. 3 the hollow conical electrode member forms part of the anode insofar as the heating electron gun is concerned which is apparent from the biasing sources connected thereto although in the overall apparatus this electrode would be a cathode relative to the ultimate target (i.e., anode) for the electrons emanating from said cathode as shown in FIG. 4.

Figure 1:
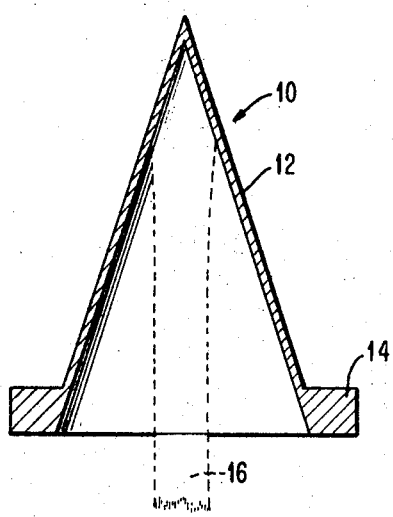
FIG. 1 is a cross-sectional view of an elevation of a hollow cone-shaped electrode made of a suitable refractory material constructed in accordance with the present invention.

Referring now specifically to the drawings, FIG. 1 illustrates an embodiment of the improved cathode of the present invention. The hollow conical cathode 10 is provided with walls 12 of uniform thickness and an enlarged shoulder portion 14 which is provided primarily for mounting purposes, as is illustrated in FIG. 3. An electron stream 16 is illustrated diagrammatically entering the interior portion of the electrode 10 striking the area adjacent the interior apex of said cone. As will be readily understood by those skilled in the art this electron bombardment causes heating of the tip of the cone and thus activates electrons in the cone tip whereby they may be readily drawn off by appropriate fields applied to the accelerating and target electrodes as will be described with reference to FIG. 4. The hollow conical structure 10 together with the indirect heating by electron bombardment virtually eliminates the hot-spot problem found with directly heated hairpin cathodes since the heat supplied to the electrode is almost independent of the geometry thereof as evaporation occurs. As stated previously, the hot-spot is usually the cause of failure of the directly heated tungsten filament and the life of the hairpin type electrode is terminated when the wire has thinned by only about 10%. Conversely in the case of the conically shaped cathode of the present invention, the electrode may be evaporated up to 75% before the useful life of the electrode is over.

Figure 2:
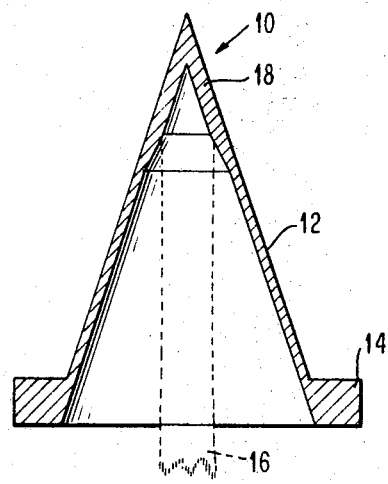
FIG. 2 is a cross-sectional view of an elevation of a preferred embodiment of such a hollow cone-shaped electrode.

The same reference numerals are used in FIGS. 2 through 4 as in FIG. 1 for similar parts of the structure. FIG. 2 illustrates another form of the invention wherein the cathode 10 again includes a conical wall section 12 and the base shoulder 14 used for mounting the cathode. However, in this embodiment it will be noted that at 18, the portion near the apex of the cone, the wall thickness is approximately double that in the remainder of the cone. This structure allows for greater evapration and/or erosion of the exterior apex portion of the cone due to sputtering and the like and thus considerably increases the useful life of the electrode. The overall thickness in the area designated by the numeral 12 is retained in the remainder of the electrode as there is no significant erosion of the electrode in either the exterior or interior portion of the cone in this area due either to electron emission or to electron heating bombardment from the electron stream 16 as illustrated. Maintaining less material in this portion means that less heat is required to raise the apex of the cone to its operative temperature as there is less material to conduct heat away from the tip.

FIG. 3 is a cross-sectional view of a cathode system utilizing the principles of the present invention and comprises a tungsten filament 20 which is directly heated from an appropriate AC source. Power is applied to the filament 20 and produces the electron beam 16 which heats the cathode 10. The tungsten filament 20 is preferably wound in a spiral configuration to provide a large durable electron source. The reason for using the accelerating electrode 22 is to shape the electron beam 16. The actual support structure for the cathode 10 is provided by the members 24, 26, and 28. The member 24 being, for example, cylindrical in shape and having the cap member 26 securely attached thereto. The retaining ring 28 clamps the electrode 10 in firm mechanical and electrical contact with the member 26. It will be noted that a DC power supply is connected to the various electrodes of the electron gun structure to provide triode gun operation. Thus the most negative potential is connected to the spiral filament 20, for example—8000 volts and then approximately half that potential, i.e.—4000 volts, is connected to the beam forming electrode 22 with the positive side of the power supply being connected to conical electrode (cathode) 10 and the anode 26. The gun thus formed is in essence, a triode structure in and of itself, however as will be readily understood in the overall apparatus the cathode 10 would be connected to a negative potential of the overall apparatus power supply and thus becomes a cathode.

FIG. 4 is a partial sectional view of the overall electron beam apparatus showing the beam forming grid or Wehnelt electrode 30 and the accelerating anode 32 located adjacent to the cathode assembly 31 in which is mounted the hollow conical cathode 10. As will be understood, the members 30 and 32 actually form the electrons emanating from the exterior apex or tip of the cathode 10 into a beam. The whole assembly would be placed in an evacuated chamber (not shown) provided with suitable connections for biasing and energizing the apparatus. The bias source 34 is connected so that the anode 32 is connected to the positive terminal (ground) and the beam forming electrode 30 is connected to the most negative side of the bias source. The cathode itself is connected to a point slightly less negative than the electrode 30.

No utilization device is specifically shown, however, the actual electron beam 36 would pass into complex focusing apparatus in the case of electron microscopy or to deflection means if used in electron beam recording or machining apparatus. The specific utilization device is not considered relevant to the present beam forming apparatus and is accordingly not shown.

In a number of experimental tests a series of hollow conical cathodes were fabricated from solid tungsten rod by cylindrical grinding and spark machining. The wall thickness of the cone at the apex was 8 mils which theoretically would require about 600 hours to evaporate at an operating temperature of 2800° K. A useful operating life of about 450 hours is therefore reasonably predictable if 75% evaporation is allowed before replacement. As stated previously, the wall thickness of the cone can be made thicker but only at the expense of the power required to heat it. A triode type electron gun of the type specifically illustrated in FIG. 3 was used to heat the cones and was provided with a spiral tungsten cathode with a life in excess of 1000 hours at the normal operating temperature of 2400° K. The cone electrode was mounted directly on the anode of the electron gun so that a minimum possible working distance was used with maximum power density obtained from the electron beam.

That the power needed to heat the cone is strongly dependent on their wall thickness was confirmed experimentally. The cone of the type illustrated in FIG. 2 with an overall wall thickness 12 of 3 mils required 50 watts to raise its tip to the normal operating temperature of about 2800° K. A cone with overall wall thickness of 4 mils required 70 watts and a cone with an overall wall thickness of 6 mils required 100 watts. The maximum power available in the particular electron gun utilized in the experiments was about 100 watts. This power was obtained with an accelerating voltage between cathode and anode of 10,000 volts with the spiral tungsten cathode 20 operating at a temperature of 2400° K. The heating electron beam diameter was of the order of 20 mils where it impinged on the interior apex of the cone electrode. The gun provided 50 watts at 9000 volts with the cathode 20 operating at 2400° K. Water cooling was used to remove heat from the plate 28 which fastens the cone 10 against the anode 26 of the electron gun.

The experimental evidence proved that the electron gun structure could supply sufficient power into a small enough area to heat the tip of the cone electrode to 2800° K. without an additional means of focusing and operating at relatively low voltage; and also that suitable refractory material cones, i.e., tungsten, could be made. Both of these factors were positively established by the experiments performed.

A maximum brightness of $2.5 \times 10^5$ amp/cm.$^2$/steradian at 12 kv. was obtained when the cathode assembly illustrated in FIG. 3 was operated in an experimental triode electron gun. This brightness compared favorably with a maximum of $1.2 \times 10^5$ amp/cm.$^2$/steradian obtained when a tungsten hairpin was used as the cathode in the identical gun geometry. The heating power required to produce the maximum brightness electron beam from the cone cathode was 55 watts. It is considered reasonable to assume that the cones would last at least 50% of their lifetime as estimated from evaporation data providing the pressure was maintained below $10^{-5}$ mm. Hg. Electrodes of the type shown in FIG. 2 are therefore capable of producing brightness of the order of $4 \times 10^4$ cm.$^2$/steradians at 12 kv. for at least 200 hours at pressures of $10^{-5}$ mm. Hg. Longer lifetime up to 400 hours should be obtainable if the pressure is maintained below $10^{-6}$ mm. Hg and cathode sputtering thus greatly reduced.

It should be reiterated that it is important in such electron guns that the electron emitting element be pointed so that the accelerating field adjacent to the cathode surface is increased and the effects of space-charge reduced. The maximum brightness that can be obtained from a three electrode electron gun of the type used in electron microscopes and related instruments depends on space-charge and any increase in the accelerating field adjacent to the cathode surface will reduce its effect and increase the brightness of the electron beam produced by the gun. The tip on the cone cathode can be made considerably finer (10 micron dimeter) than that of a 0.005" tungsten hairpin (125 micron diameter) which is conveniently used.

There has thus been disclosed and described a novel electron beam apparatus including an improved electron emissive electrode structure therefore wherein the electrode serves as a cathode in the primary electron beam apparatus. The cathode structure per se has the advantage of improved brightness, long life, good mechanical stability, and provides a point source for the electron beam. While certain configurations of the heating electron gun and the heater cathode 20 are specifically shown in the drawings and described in the specification, it is to be understood that these are intended to be only exemplary of the invention. For example, other refractory materials than tungsten, such as lanthanum hexaboride which runs cooler than tungsten, could be used as the material for making the electrode per se and somewhat different configurations of the electron gun could be used and still obtain indirect electron bombardment type heating of the hollow electrode structure. Similarly, while the hollow pointed cathode 10 has been illustraated and described as a cone, and this is believed to be the preferred embodiment, it will be appreciated that a hollow pointed electrode having the configuration of a multifaceted hollow pyramid could equally well suffice.

While the invention has been particularly shown and described with reference to preferred embodiments thereof, it will be understood by those skilled in the art that various changes in form and details may be made therein without departing from the spirit and scope of the invention.

What is claimed is:
1. Apparatus for forming and utilizing a high intensity electron beam in an evacuated chamber which comprises:
   an electron point source assembly including:
   a hollow pyramidal refractory material electrode member said pyramid having at least three sides and having a base portion and interior and exterior apex portions,
   support means adjacent said base portion for mounting said hollow pyramidal electrode for heating by external means, said external heating means comprising indirect heating means for said electrode comprising a primary source of electrons, means for energizing said primary electron source, means for forming a beam from said electrons from said primary source and for causing said beam to bombard the interior apex portion of said electrode member and heat same sufficiently to stimulate electron emission from the exterior apex portion, said hollow refractory electrode member comprising a secondary point source of electrons in said apparatus, and means for withdrawing electrons substantially exclusively from said exterior apex portion of said electrode, means for forming said electrons into a high intensity beam, and wherein said beam proceeds to means for utilizing same.

2. Electron beam apparatus as set forth in claim 1 wherein said cathode is conical.

3. Electron beam apparatus as set forth in claim 2 wherein said refractory material is tungsten.

4. Electron beam apparatus as set forth in claim 2 wherein said refractory material is lanthanum hexaboride.

5. Electron beam apparatus as set forth in claim 2, said cathode being characterized by having a wall thickness adjacent the apex thereof approximately twice the overall wall thickness adjacent the base thereof.

6. Electron beam apparatus as set forth in claim 2 wherein said primary source of electrons comprises a spiral directly heated tungsten filament.

References Cited

UNITED STATES PATENTS

| | | | |
|---|---|---|---|
| 1,850,957 | 3/1932 | Foster | 313—351 X |
| 1,864,591 | 6/1932 | Foster | 313—270 X |
| 2,141,838 | 12/1938 | Farnsworth | 313—337 X |
| 2,567,624 | 9/1951 | Thomson et al. | 313—337 X |
| 3,091,719 | 5/1963 | Dyke et al. | 313—336 X |

JOHN W. HUCKERT, Primary Examiner

A. J. JAMES, Assistant Examiner

U.S. Cl. X.R.

313—336, 351, 337, 270, 237